Figure 1:
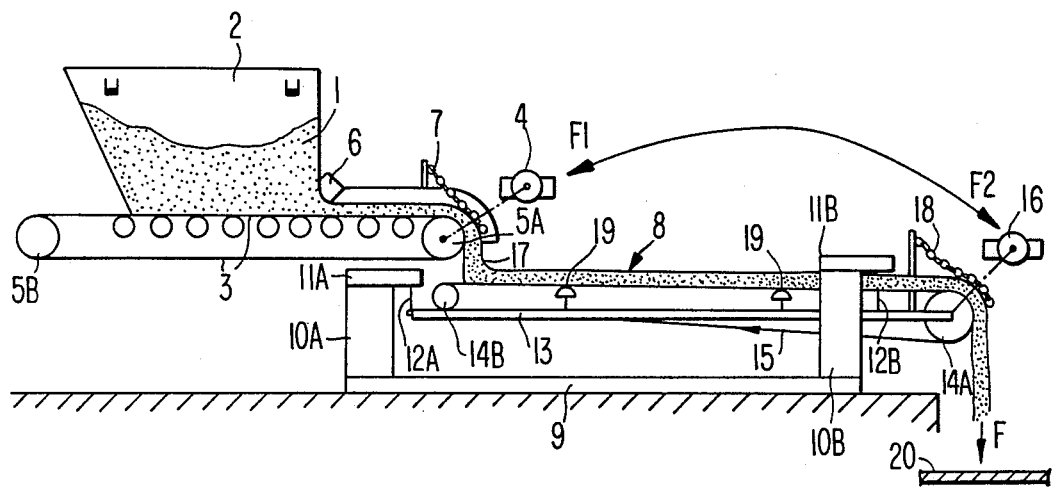

United States Patent [19]

Sichet

[11] Patent Number: 4,729,442
[45] Date of Patent: Mar. 8, 1988

[54] APPARATUS FOR THE WEIGHTED DOSING OF GRANULATED OR PULVERULENT PRODUCTS

[75] Inventor: Jean-Luc Sichet, Saint Herblain, France

[73] Assignee: Societe Chimique des Charbonnages S.A., Paris, France

[21] Appl. No.: 26,612

[22] PCT Filed: Jun. 19, 1986

[86] PCT No.: PCT/FR86/00211
§ 371 Date: Feb. 6, 1987
§ 102(e) Date: Feb. 6, 1987

[87] PCT Pub. No.: WO86/07629
PCT Pub. Date: Dec. 31, 1986

[30] Foreign Application Priority Data

Jun. 20, 1985 [FR] France ................................ 85 09406

[51] Int. Cl.$^4$ ...................... G01G 13/02; G01G 11/08; B65G 37/00
[52] U.S. Cl. ...................................... 177/50; 177/123; 198/505; 198/577; 222/55
[58] Field of Search .................. 177/50, 123; 198/505, 198/575, 577; 222/55

[56] References Cited

U.S. PATENT DOCUMENTS

| | | | |
|---|---|---|---|
| 2,637,434 | 5/1953 | Harper | 198/505 |
| 2,662,665 | 12/1953 | Harper | 198/577 X |
| 3,139,217 | 6/1964 | Mell | 198/505 X |
| 3,162,325 | 12/1964 | Hall et al. | 222/55 |
| 3,897,868 | 8/1975 | Smith, Jr. | 198/505 |

FOREIGN PATENT DOCUMENTS 436658 10/1935 United Kingdom ................ 198/505

*Primary Examiner*—George H. Miller, Jr.

*Attorney, Agent, or Firm*—Finnegan, Henderson, Farabow, Garrett & Dunner

[57] ABSTRACT

Apparatus making it possible to effect accurately in line and continuously the weight feeding of granulated or pulverulent products.

It comprises two separated endless belts for extraction and dispensing. The endless belt of the dispenser is continuously weighed as a whole and the speed of the extraction apparatus is controlled to the measurement of the instantaneous load of product distributed on the dispenser belt. It comprises:

a hopper (2) for storing the product to be weighed under which is arranged an endless belt 3 for extraction of which one of the two support drums (5A, 5B) is driven at a variable speed by a motor-reduction gear, a dispenser unit disposed below and in line with the endless belt 3 of the extractor, this unit being constituted of, a fixed T-shaped support frame (9) which is provided at its ends with three pillars (10A-10B-10C) supporting three strain gauge type flexion weight indicators (11A-11B-11C) which are provided with flexible suspension cables (12A-12B-12C) to which is suspended an ultralight tubular frame (13) and, an endless belt of which drums 14A-14B are supported by said frame 13, one of the drum 14A being driven at variable speed by a motor-reduction gear unit (16).

an electronic control chain F1-F2 between the motor-reductor gear unit (16) driving the endless belt (15) of the dispenser and the endless belt of the extractor (3) said chain being such that the speed of the endless belt of the extractor (3) is controlled in dependence to the measurement of the instantaneous load of product distributed on the dispenser belt (15). Application to the fertilizer industry.

7 Claims, 4 Drawing Figures

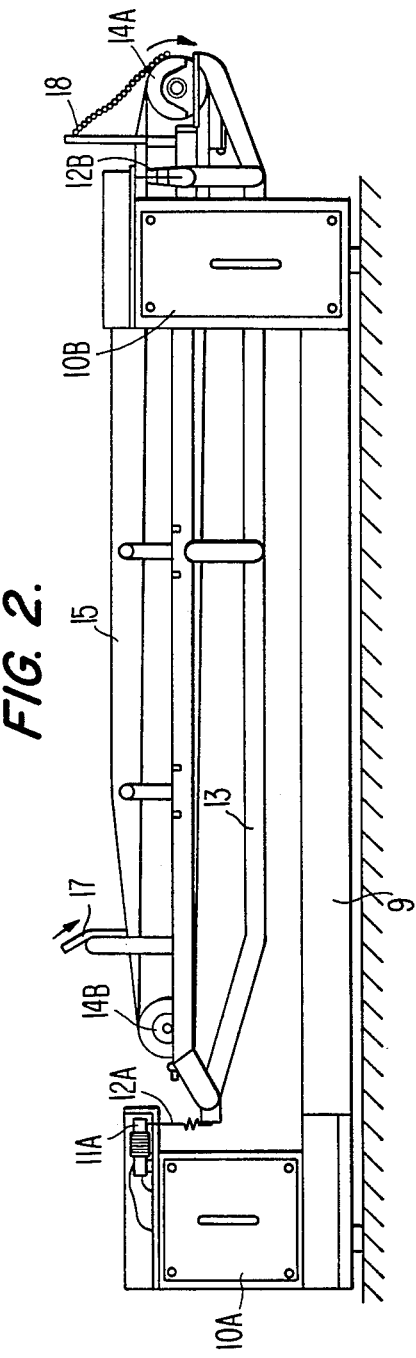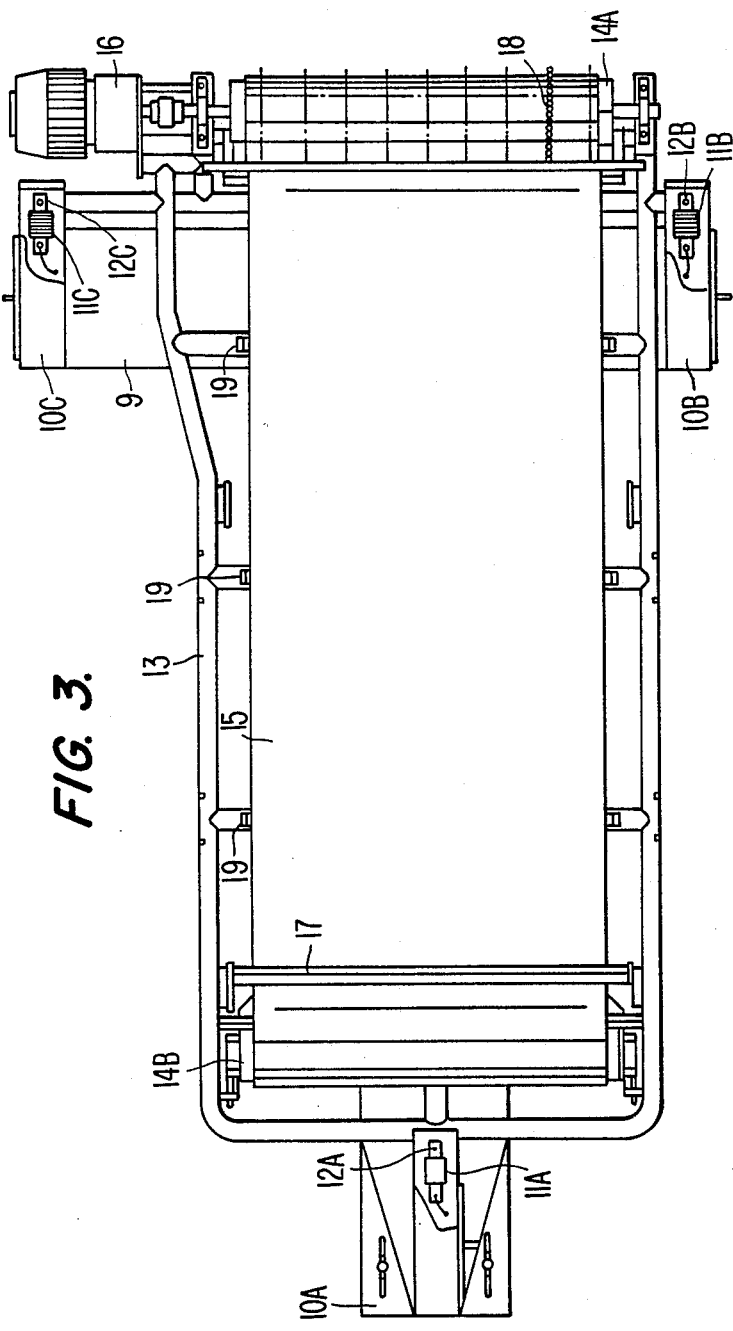

APPARATUS FOR THE WEIGHTED DOSING OF GRANULATED OR PULVERULENT PRODUCTS

The present invention relates generally to an improved apparatus making it possible to effect accurately, in line and continuously, the weight feeding or continuous mixing of a plurality of granulated or pulverulent products, such as: potassium chloride, sand, cement, phosphate, granules, and the like, this feeding generally being effected at the beginning of a production process, for example in the fertilizer industry, the cement and concrete industry, the agricultural foodstuffs industry, and so on.

Apparatus already known make it possible to extract the product to be weighed from a hopper by means of a variable delivery extraction apparatus, to drop this extracted product on to the endless belt of a dispenser, which is suspended and continuously weighed as a whole, to drive said dispenser belt at a determined speed corresponding to a given programmed delivery of the dispenser, and controlling the speed of the extractor belt to the measurement of the instantaneous load of product distributed on the dispenser belt.

In the apparatus known at present time use is made either of dispensers effecting separate extraction or of single or double weighing rollers and integrating weighing machines.

Study of metrological criteria has led the Applicants to discard single-belt dispensers, which have serious disadvantages inasmuch as:
(a) Performance is modified by the dirtying of rollers, and by the speed, tension and quality of the belt, as well as by the hopper load,
(b) Calibration is difficult and lengthy because it requires complete emptying of the hopper,
(c) The product weighing length is poorly defined.

Separate-extraction dispensers known at the present time consist of an endless belt receiving the product from an extractor disposed under a hopper, the entire belt arrangement being pivoted about a fixed axis and suspended at its other end on a weight transducer, a counterweight optionally being disposed opposite said transducer in order to balance the dispenser under no-load conditions. In other apparatus the endless belt of the dispenser is suspended at one arm of a balance, the other arm bearing weights.

Whatever their mode of operation, these dispensers have disadvantages, such as lack of sensitivity around the fixed axis, the fact that their performance is modified by the quality and homogeneity of the belt.

The present invention concerns an apparatus making it possible to effect accurately in line and continuously the weight feeding of granulated or pulverulent products comprising two separated endless belts for extraction and dispensing in which the endless belt of the dispenser is continuously weighed as a whole and in which the speed of the extraction apparatus is controlled to the measurement of the instantaneous load of product distributed on the dispenser belt characterized in that it comprises:
a hopper for storing the product to be weighed under which is arranged an endless belt for extraction, of which one of the drums is driven at variable speed by a motor-reduction gear.
a dispenser unit disposed below and in line with the extraction endless belt, this unit being constituted of a fixed T shaped support frame which at its ends is provided with three pilars supporting three strain gauge type flexion weight indicators which are provided with flexible suspension cables to which an ultralight tubular frame is attached an endless belt of which drums are supported by said ultralight tubular frame, one of the drums being driven at variable speed by a motor-reduction gear unit:
an electronic control chain between the motor-reduction gear unit driving the endless belt of the dispenser and the motor-reduction gear unit of the endless belt of the extractor, said chain being such that the speed of the extraction apparatus is controlled in dependance to the measurement of the instantaneous load of product distributed on the dispenser belt.

The apparatus of the present application provides substantial advantages including the following:
the extraction apparatus can be optimized in accordance with the product,
accuracy is improved, particularly with low delivery, and may be as high as +0.2% of the delivery displayed,
there is a wide range of variation of the flow, which may extend from 5 to 100% of rated delivery for one and the same dispenser,
the tension and quality of the belt used are immaterial,
perfect accessibility for cleaning and maintenance,
very slight deviation from calibration.

Other characteristics, advantages and features of the present invention will be clear from the description of the latter which is given below with reference to the accompanying drawings showing, diagrammatically and simply, one possible embodiment of the invention which is given as a preferred exmaple.

Figure 4:
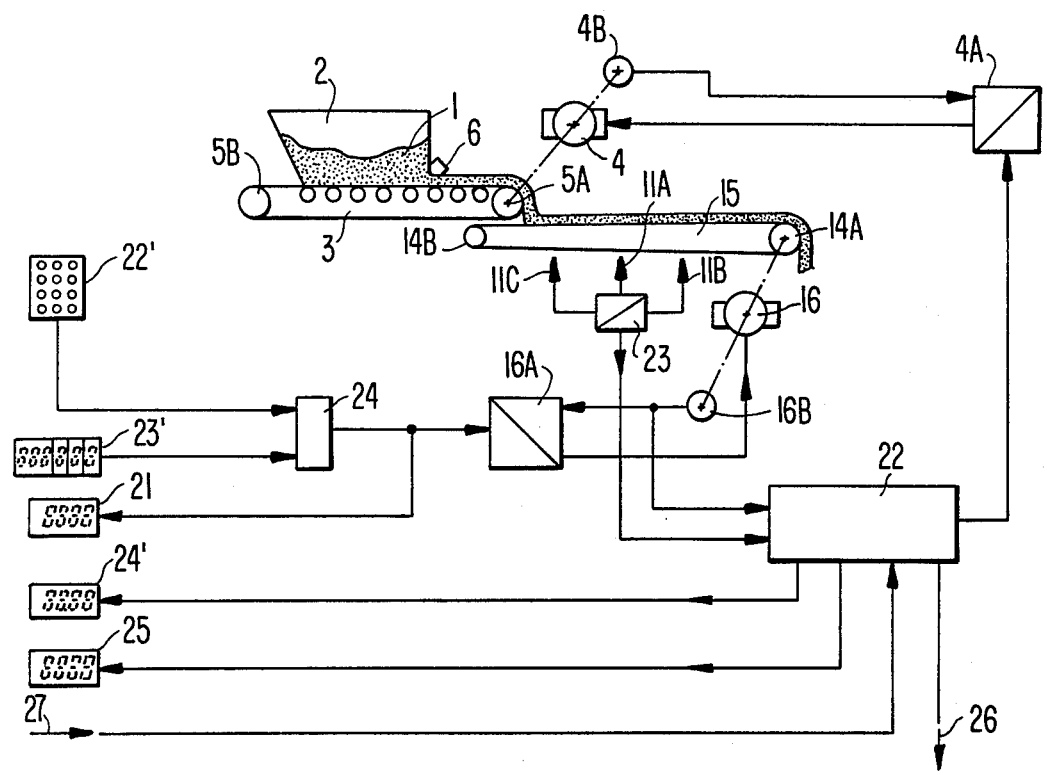

In these drawings,

FIG. 1 is a diagram showing in elevation a continuous metering arrangement applying the process according to the invention, FIGS. 2 and 3 are detail views on a larger scale, showing, in elevation and in plan respectively, the actual dispenser, and FIG. 4 is a basic diagram of the regulation and operation of the continuous weight feeding installation utilizing the process according to the invention.

Referring firstly to FIG. 1, it can be seen that in accordance with the invention the product 1 to be dispensed is stored in a hopper 2, below which is disposed an endless belt type extractor 3. This belt is supported by drive and return drums 5A, 5B and is driven at variable speed by a direct-current laminated-winding motor-reduction gear unit which is provided with a speed takeoff and is given the general reference 4, and which acts on the front drive drum 5A of the extractor belt.

A manually or automatically controlled hood 6 is disposed at the end of the extractor for the purpose of regulating the height of the layer of product 1 extracted from the hopper 2 by the belt 3.

A series of chains 7 is disposed transversely of the belt 3, just upstream of the point where the product drops. These chains, which constitute a sort of transverve curtain, serve the purpose of regularizing the delivery and fractionating the product in order to reduce the effect of the fall onto the actual dispenser unit, which is given the general reference 8 and is disposed under and in line with the extractor belt 3.

This dispenser unit 8 (see also FIGS. 2 and 3) is composed of a fixed T-shaped support frame 9, which at its ends is provided with three pillars 10A, 10B, 10C supporting three strain gauge type flexion weight indicators, which are provided with flexible suspension cables 12A, 12B, 12C to which an ultralight tubular frame 13 is attached.

This suspended tubular frame serves as support for drive and return drums 14A, 14B of an endless belt forming a dispenser belt 15 and is driven at variable speed by a direct-current laminated-winding motor-reduction gear unit provided with a speed takeoff and given the general reference 16.

In order that the weighing length may be accurately delimited, a throwing table 17 is disposed at the rear part of the tubular frame 13 which is situated under the extractor belt 3, for the purpose of receiving the product 1 thrown back by the latter, while a transverse curtain of chains 18 is installed at the outlet of the belt 15 of the dispenser and serves the purpose of always fractionating the product at the same spot and throwing it back in the direction of the arrow F towards a collector belt 20 for the continuation of the treatment of the product.

In addition, the belt 15 of the dispenser slides over a series of upwardly inclined self-sliding carrier troughs 19, which raise the edges of the belt 15 of the dispenser along all the part where weighing is effected. It can be seen that the dispenser belt 15 which receives the product 1 (from the extractor belt 3) transports this product to the outlet while constantly effecting the instantaneous integral weighing by means of the system comprising the weight indicators 11A, 11B, 11C over a very precise length.

The dispenser belt 15 is driven by its motor 16 at a determined speed corresponding to a given programmed delivery of the dispenser unit 8.

According to an essential characteristic of the process of the invention the speed at which the extractor belt 3 is driven by its motor 4 is controlled in dependence to the measurement of the instantaneous load of product distributed on the dispenser belt, this being achieved by means of a control chain indicated schematically by the double arrow F1-F2 in FIG. 1, this being done in such a manner that if the measurement of the instantaneous load of product distributed over the extractor belt 15 does not correspond to the individual set point of the dispenser unit 8, the speed of the extractor belt 3 will be automatically corrected in the upward or downward direction so as to keep the load of product constant whatever the programmed delivery of the dispenser.

Referring now more particularly to FIG. 4, a description will be given very briefly to explain how, as an example, the control chain (F1-F2) may be constructed for controlling the speed of the extractor belt 3 in dependence on the measurement of the instantaneous load of product distributed on the dispenser belt and correcting it so that the load of product on the dispenser belt will remain constant whatever the programmed delivery of the dispenser.

For this purpose the electrical part is composed of three interdependent looped control chains and two digital computers with their ancillary equipment.

The complete control system comprises:
 (a) a loop controlling the speed of the belt 15 of the dispenser,
 (b) a weight control loop, and
 (c) a loop controlling the speed of the extractor belt.

The first loop (a) enables the linear speed of the belt 15 of the dispenser to be controlled (with an accuracy of +1/1000) in dependence on the individual programmed delivery set point of the dispenser.

This individual programmed delivery set point of the dispenser is displayed in clear in tonnes per hour on a digital display 21, and is the result of a calculation made on the basis of the two signals, namely:
 1. The general set point signal of all the dispensers of an installation, this digital signal expressed in tonnes per hour being worked out from a keyboard 22'.
 2. The signal originating from the dispenser concerned, which is a proportion and constitutes the individual set point associated with that dispenser and expressed in kilograms per tonne of the final product, this signal being worked out with the aid of code wheels and displayed on a display 23'.

These two signals are fed to the inputs on a first digital computer 24, which effects the following operation: (general set point in t/h)×(proportion corresponding to the dispenser in kg/t)=programmed delivery set point in kg/h.

As a numerical example, it may be mentioned that the exemplified dispensing installation has in particular been used with a general set point of 32 t/h and an individual set point of the respective dispenser of 110 kg/t, which corresponds to a programmed delivery set point of 3520 kg/h.

This programmed delivery set point is on the one hand displayed on the digital display 21, and on the other hand controls the speed variator 16A of the motor-reduction gear unit 16 of the dispenser.

The controller of this variator permanently maintains the speed stability of the motor 16 driving the drum 14A of the dispenser 15 by comparing the programmed delivery set point 21 with the actual speed measurement supplied by the transducer 16B mounted in the motor-reduction gear unit.

The second control loop, the weight control loop (b), makes it possible to control and accurately maintain a constant load of product on the dispenser, whatever the programmed delivery, that is to say whatever the speed of the dispenser belt.

For this purpose a weight controller 22, which has a preprogrammed internal set point, is provided.

In addition, the actual instantaneous measurement of the weight on the dispenser, originating from the signal of the three strain gauges 11A, 11B, 11C mounted in parallel, is amplified and filtered by means of a weight transmitter 23, and is fed to the weight controller 22 which has a preprogrammed set point.

When the difference between this set point and the actual instantaneous measurement of the weight on the dispenser, originating from the weight transmitter, is not zero, the controller will supply a positive or negative correction signal to the speed variator 4A of the motor-reduction gear unit 4 driving the drum 5A of the extractor belt 3, which has the effect of increasing or reducing the amount of product reaching the dispenser, in order to eliminate the weight difference detected.

It is important to note that when the dispenser is empty, on commencing operation, the output signal of this controller is masked by that of a ramp generator, which has the effect of gradually and uniformly loading the dispenser; when the weight on the dispenser corresponds to the preprogrammed internal set point, the controller takes over and maintains a constant weight on the dispenser.

The third control loop (c), controlling the speed of the extraction belt, makes it possible to control accurately the linear speed of the extractor belt in dependence on the correction signal given by the weight controller 22.

For this purpose this weight controller 22, as has been seen, provides at its output positive or negative corrective set point steps which are first mixed with the set point signal of the programmed delivery of the dispenser from the first loop (a). The signal produced by this mixing serves as set point for the speed variator 4A of the extractor belt motor 4.

The controller of this variator therefore continuously adjusts the speed of the extractor motor by comparing this correction set point with the actual speed measurement supplied by the speed transducer 4B installed in the motor-reduction gear unit.

A second computer incorporated in the weight controller 22 serves the purpose of effecting the following calculation.

(Actual instantaneous delivery)=(actual instantaneous weight on the dispenser)×(actual instantaneous speed of the dispenser belt).

For this purpose the weight information coming from the weight transmitter 23 is fed to one of the inputs of the computer, while the speed information coming from the speed transducer 16B installed in the motor-reduction gear unit of the dispenser belt 15 arrives in coded digital form and is fed to the other input of the computer.

The result of this calculation of the actual instantaneous delivery calculation is directly displayed in clear on a digital display 24'.

The operator is therefore able to check by a single glance the correct operation of the dispenser by comparing the readings of the two displays: the delivery set point 21 and the actual instantaneous delivery 24'; in normal operation these displays should be identical.

This computer 22 also enables counting and control of alarms to be carried out with the aid of the two electronic circuits.

For counting purposes the linear actual instantaneous delivery output signal is converted into a proportional pulse signal permitting the outputting of a signal complying with requirements, that is to say one pulse per unit of product treated, for example one pulse per 100 g or one pulse per 1 kg, and so on.

This adapted signal is then counted and stored in a digital counter 25 enabling the amount of product passed to be known.

For the purpose of alarm control, the actual instantaneous delivery signal is compared with the delivery set point signal 21 of the dispenser. The comparator has two adjustable alarm thresholds, for example at +2%; if the signal passes one of these two thresholds, a control circuit 26 will, at the end of a given period of time, operate a light and/or acoustic alarm relay, and, at the end of a given longer period of time, another relay effecting the disconnection of the general set point of the dispensing installation.

Suitable instructions can be given to the computer 22 at 27.

It is obvious that the present invention has been described and illustrated only in respect of a preferred example, and that technical equivalents could be used for its component parts without departing from its scope.

I claim:

1. Apparatus making it possible to effect accurately in line and continuously the weight feeding of granulated or pulverulent products comprising two separated endless belts for extracting and dispensing, in which the endless belt of the dispenser is continuously weighed as a whole and in which the speed of the extraction apparatus is controlled to the measurement of the instantaneous load of product distributed on the dispenser belt characterized in that it comprises:
   a hopper (2) for storing the product to be weighed under which is arranged an endless belt (3) for extraction, of which one of the two support drums (5A, 5B) is driven at a variable speed by a motor-reduction gear (4),
   a dispenser unit (8) disposed below and in line with the endless belt (3) of the extractor, this unit being constituted of a fixed T-shaped support frame (9) which is provided at its ends with three pillars (10A-10B-10C) supporting three strain gauge type flexion weight indicators (11A, 11B, 11C) which are provided with flexible suspension cables (12A, 12B, 12C), an ultralight tubular frame (13), an endless belt (15) of which drums (14A-14B) are supported by said frame (13), one of the drums (14A) being driven at variable speed by a motor-reduction gear unit (16),
   an electronic control chain F1-F2 between the motor reductor gear unit (16) driving the endless belt (15) of the dispenser and the motor gear unit (4) of the endless belt of the extractor (3), said chain being such that the speed of the endless belt of the extractor (3) is controlled in dependence to the measurement of the instantaneous load of product distributed on the dispenser belt (15).

2. Apparatus according to claim 1 characterized in that transverse curtains of chains (7–18) are disposed just upstream of the point where the product is dropped, for the purpose of regularizing the delivery of the product both onto the extraction apparatus (3) and onto the dispenser (8) and fractionating said product and reducing the effect of the drop at the outlets of these apparatus.

3. Apparatus according to claim 1 or 2 characterized in that the motor-reduction gear units (4, 16) of the extraction apparatus (3) and of the dispenser (8) are direct-current laminated-winding units provided with a speed takeoff.

4. Apparatus according to claim 1 characterized in that the electronic part of the system controlling the speed of the extraction apparatus (3) in dependence on the measurement of the instantaneous load on the dispenser belt (15) is composed of three looped interdependent control chains and two digital computers with their ancillary equipment; a first loop permitting control of the linear speed of the dispenser belt (15) in dependence on the individual programmed delivery set point of the dispenser (8) and containing a computer (24) whose output signal controls the speed variator (16A) of the motor-reduction gear unit (16) of the dispenser, the controller of this variator permanently maintaining the speed stability of the motor (16') by comparing the programmed delivery set point (21) with the actual measurement of speed supplied by the speed transducer (16B) installed in the motor-reduction gear unit (16); a second loop making it possible to control and accurately maintain a constant load of product on the dispenser whatever the programmed delivery, this loop containing a weight controller (22) having a preprogrammed delivery internal weight set point and receiving the actual instantaneous measurement of the weight on the dispenser from a weight transmitter (23) receiving the signals from the strain gauges (11A-11B-11C), said weight controller (22) supplying, in dependence on the difference between said prepogrammed set point and said actual instantaneous measurement, a positive or negative correction signal to the speed variator (4A) of the motor-reduction gear unit (4) of the extraction apparatus (3); a third loop making it possible to control accurately the linear speed of the extraction apparatus (3) in dependence on the correction signal supplied by the weight controller (22), which signal is mixed with the programmed delivery set point signal of the dispenser in the first loop and is fed as correction set point to the variator (4A) of the motor-reduction gear unit (4) of the extraction apparatus (3), the controller of this variator permanently adjusting the speed stability of the motor (4) by comparing the correction set point with the actual speed measurement supplied by the speed transducer (4B) installed in the motor-reduction gear unit (4).

5. Apparatus according to claim 4 characterized in that when the dispenser is empty, on starting up, the output signal of the weight controller (22) is masked by the signal of a ramp generator which has the effect of gradually and uniformly loading the dispenser belt (15), and that when the weight on the dispenser belt (15) corresponds to the internal preprogrammed set point in the controller (22), the latter takes over and maintains a constant weight on the dispenser belt (15).

6. Apparatus according to claim 5 characterized in that a second computer serves the purpose of making the calculation:

(Actual instantaneous delivery)=(actual instantaneous weight on the dispenser belt)×(actual instantaneous speed of the dispenser belt), the weight information coming from the weight transmitter (23) being fed to one of the inputs of the computer, while the speed information coming from the speed transducer (16B) installed in the motor-reduction gear unit of the dispenser belt (15) arrives in coded digital from and is fed to the other input of the computer, as the consequence of which the result of this actual instantaneous delivery is directly displayed in clear on a digital display (24) and, then compared with the delivery set point (21) of the dispenser, makes it possible to check that the dispenser plant (8) is working normally.

7. Apparatus according to claim 6 characterized in that the actual instantaneous delivery output signal of the second computer is processed by two electronic circuits: in the first, which is used for counting, the linear actual instantaneous delivery signal is converted into a proportional pulse signal, one pulse per unit of product dispensed, and is counted and stored in a digital counter (25) making it possible to ascertain the amount of product passed; in the second, which is used for control of alarms, the actual instantaneous delivery signal is compared with the delivery set point (21) signal of the dispenser in a comparator having two adjustable alarm thresholds, and if one of these thesholds is passed an alarm control circuit (26) will, at the end of a given period of time, operate a light and/or acoustic alarm relay and, at the end of a given longer period of time, another relay controlling the general disconnection of the dispensing plant.

* * * * *